(12) United States Patent
Cornolti et al.

(10) Patent No.: US 7,267,210 B2
(45) Date of Patent: Sep. 11, 2007

(54) BRAKING BANK AND DISC FOR DISC BRAKE

(75) Inventors: Raffaello Cornolti, Sorisole (IT); Alberto Previtali, Palazzago (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 0 days.

(21) Appl. No.: 10/471,631

(22) PCT Filed: Mar. 14, 2001

(86) PCT No.: PCT/IT01/00129

§ 371 (c)(1), (2), (4) Date: Sep. 12, 2003

(87) PCT Pub. No.: WO02/073060

PCT Pub. Date: Sep. 19, 2002

(65) Prior Publication Data

US 2004/0084257 A1   May 6, 2004

(51) Int. Cl.
*F16D 65/12* (2006.01)
(52) U.S. Cl. .......................... 188/218 XL; 188/264 AA
(58) Field of Classification Search ......... 188/218 XL, 188/18 A, 264 A, 264 AA
See application file for complete search history.

(56) References Cited

U.S. PATENT DOCUMENTS

| | | | |
|---|---|---|---|
| 3,899,054 A | * | 8/1975 | Huntress et al. ...... 188/218 XL |
| 4,712,656 A | | 12/1987 | Courtois |
| 5,279,396 A | | 1/1994 | Estaque et al. |
| 5,427,212 A | * | 6/1995 | Shimazu et al. ...... 188/218 XL |
| 5,568,846 A | * | 10/1996 | Dagh et al. .......... 188/218 XL |
| 6,145,636 A | * | 11/2000 | Ikari et al. .......... 188/218 XL |

FOREIGN PATENT DOCUMENTS

| | | | |
|---|---|---|---|
| DE | 42 10 449 | * | 10/1993 |
| DE | 43 23 782 A1 | | 1/1994 |
| DE | 43 32 693 A1 | | 3/1995 |
| GB | 847120 | | 9/1960 |
| GB | 2060796 | * | 5/1981 |

OTHER PUBLICATIONS

International Search Report dated Sep. 4, 2001, for Application No. PCT/IT01/00129.

* cited by examiner

*Primary Examiner*—Bradley King
(74) *Attorney, Agent, or Firm*—Hogan & Hartson LLP (57) ABSTRACT

A braking band (14) of a disc-brake disc (10), which has an unusual ability to improve the cooling efficiency of the disc brake, comprises a first plate (20) and a second plate (22) arranged face to face so as to form a space (24). A set of spacer elements (26-32) which connect the first plate (20) and the second plate. (22) constitutes a module which is repeated around a circle coaxial with the braking band. The set comprises a first fin (26) which connects the first plate (20) to the second plate (22) and which extends along an arcuate line (36). The set of spacer elements further comprises a second fin (28), a third fin (30), and a fourth fin (32) which connect the first plate (20) to the second plate (22) and which extend along a further arcuate line (46) interposed between two adjacent arcuate lines (36).

48 Claims, 6 Drawing Sheets

BRAKING BANK AND DISC FOR DISC BRAKE

FIELD OF THE INVENTION

The present invention relates to a braking band and to a disc for a ventilated disc brake, particularly but not exclusively for applications in the automotive field.

BACKGROUND OF THE INVENTION

As is known, a disc of the type specified above is constituted by two coaxial portions. A first portion, the support bell, is for connection to the wheel hub of a vehicle, and the remaining, peripheral portion, the so-called braking band, is for cooperating with the disc-brake calipers to exert the braking force on the vehicle.

It is also known that, during the operation of the brakes, the friction between the pads of the brake calipers and the surface of the braking band generates a large amount of heat which has to be dissipated. The heat generated in fact causes many undesired phenomena such as, for example, the formation of cracks on the braking surface, permanent deformations after cooling, or localized changes in state which in turn lead to vibrations.

In particular, in applications on high-performance motor-cars with high braking efficiency, the energy to be dissipated is very high and there is an even greater need to dissipate the heat generated during braking.

This need for increased cooling efficiency must, however be reconciled with the further need to keep the space occupied by the discs unchanged to avoid modifications to the suspension of the vehicle for which they are intended.

For this purpose, ventilated discs have undergone continuous development, particularly with regard to the number and configuration of the so-called ventilation ducts which are defined between the two plates that conventionally make up ventilated discs, and between fins which connect the two plates transversely.

For example, fins constituted by curved walls repeated at a modular frequency, in which the module itself is constituted by two fins of which one is longer than the other are known from U.S. Pat. No. 5,427,212.

The above-mentioned example of a disc-brake disc cannot ensure effective cooling such as to overcome the above-mentioned disadvantages completely.

The problem underlying the present invention is therefore that of devising a disc-brake disc which has structural and functional characteristics such as to satisfy the above-mentioned requirements and at the same time to prevent the problems mentioned with reference to the prior art.

SUMMARY OF THE INVENTION

This problem is solved by a braking band according to claim 1 and by a disc-brake disc according to claim 24.

BRIEF DESCRIPTION OF THE DRAWINGS

Further characteristics and advantages of the disc-brake disc according to the invention will become clear from the following description of a preferred embodiment thereof, provided by way of non-limiting example with reference to the appended drawings, in which.

DETAILED DESCRIPTION OF THE INVENTION

With reference to the above-mentioned drawings, a ventilated disc according to the present invention, for use in a disc brake (not shown) of a vehicle such as a motorcar, is generally indicated 10.

Figure 1:
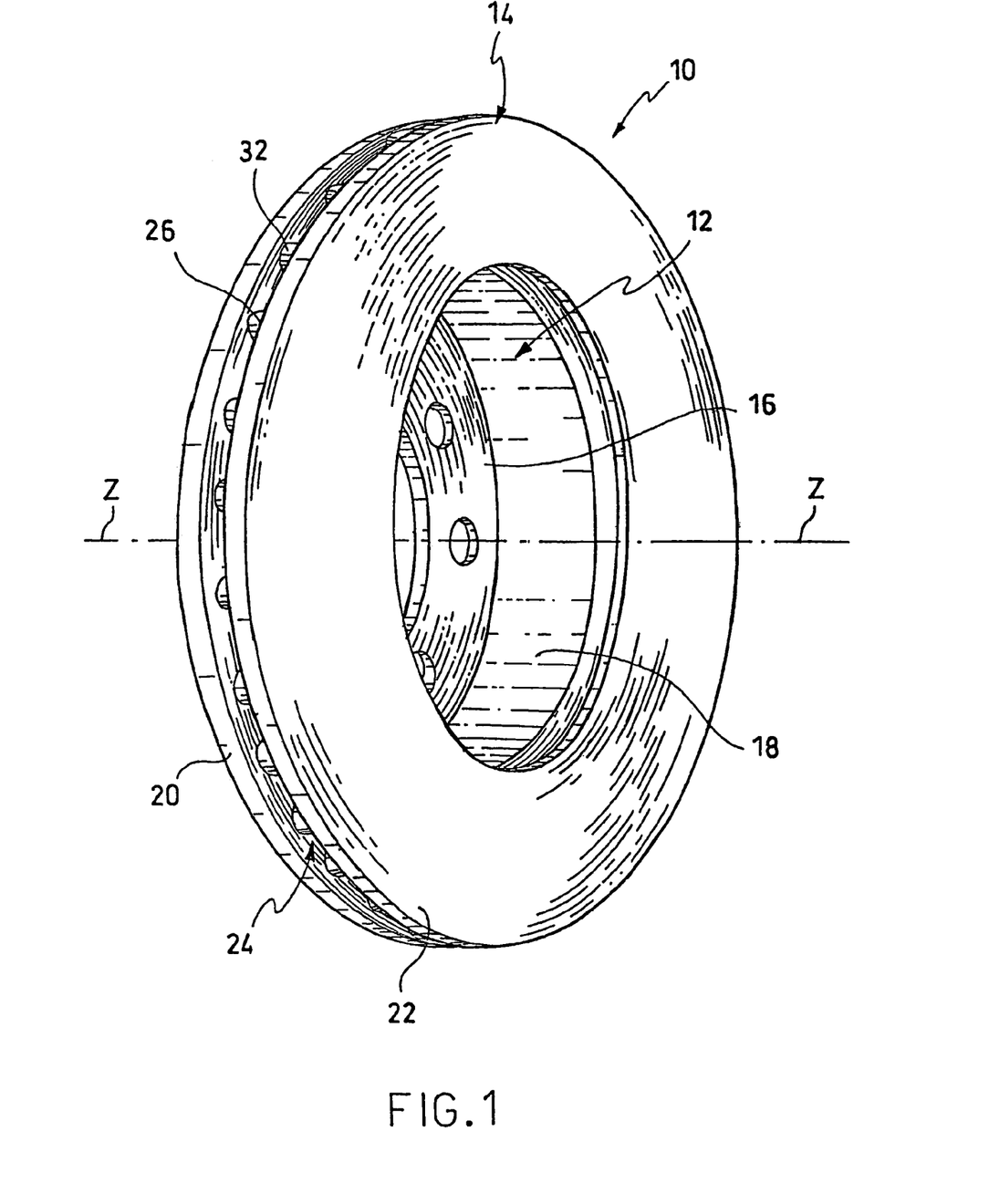
FIG. 1 is a perspective view of a disc-brake disc according to the invention.

The disc 10 has a substantially circular shape and extends about an axis indicated Z-Z in FIG. 1.

Figure 7:
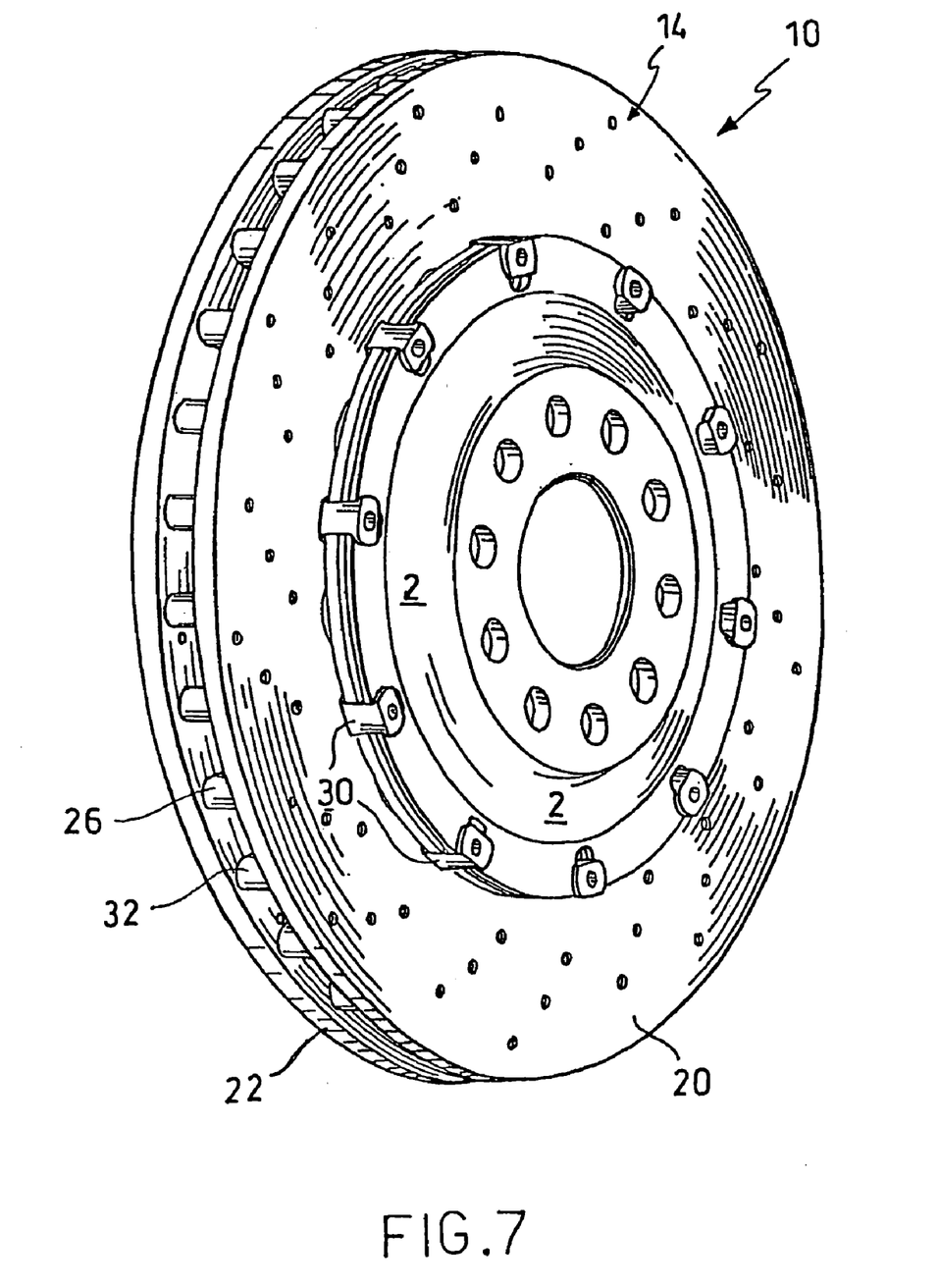
FIG. 7 is a perspective view of a disc-brake disc according to a possible variant.

The disc 10 comprises a support bell 12 and a braking band 14 coaxial with the bell 12. The support bell 12 and the braking band 14 may be connected to one another either rigidly or by means of connections which permit differential expansion. An example of a bell 12 and a braking band 14 in the assembled condition is shown in FIG. 7. Preferably, the braking band 14 is made of cast iron of the type usually used for brake discs such as, for example, cast iron with a high carbon content.

The support bell 12 comprises a central portion 16 for connection to the wheel hub of a vehicle, in conventional manner, and an annular, peripheral portion 18 which projects from the central portion 16 in a direction substantially parallel to the axis Z-Z.

The braking band 14, which is intended to cooperate with the disc-brake calipers in order to exert the braking force on the vehicle, comprises a first plate 20 and a second plate 22 arranged face to face so as to form an air-outlet space 24. The first plate 20 is disposed on the same side as the support bell 12 and the second plate 22 is disposed on the opposite side.

The second plate 22 is fixed to the first plate 20 by spacer elements and, in the embodiment in question, by fins 26, 28, 30 and 32 which are shaped so as to define ventilation ducts 34.

The fins 26, 28, 30 and 32 form a module which is arranged at predetermined intervals around a circle in the braking band 14 so as to form a plurality of ventilation ducts 34 distributed uniformly around the space between the two plates.

Figure 4:
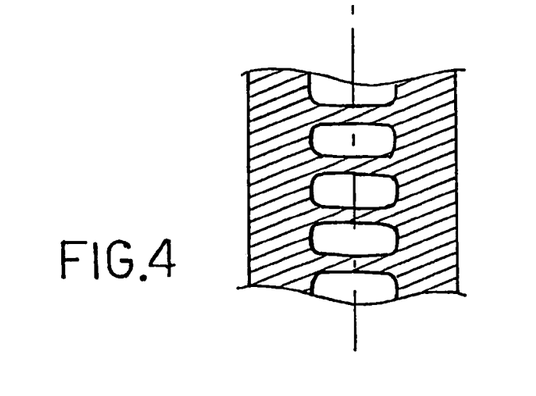
FIG. 4 is a section taken on the line IV-VI through the detail of FIG. 2.

The first fin 26 connects the first plate 20 and the second plate 22 continuously, as can be seen from FIG. 4.

An inner end 26a of the first fin 26 is "V"-shaped and has its concavity facing towards the centre of the braking band 14, whereas the outer end 26b of the first fin 26 has a profile substantially perpendicular to the first plate 20 and to the second plate 22.

In greater detail, the "V"-shaped end comprises two straight portions inclined substantially at 45° to the first plate 20 and to the second plate 22 and connected in the region of a centreline of the first fin.

Figure 2:
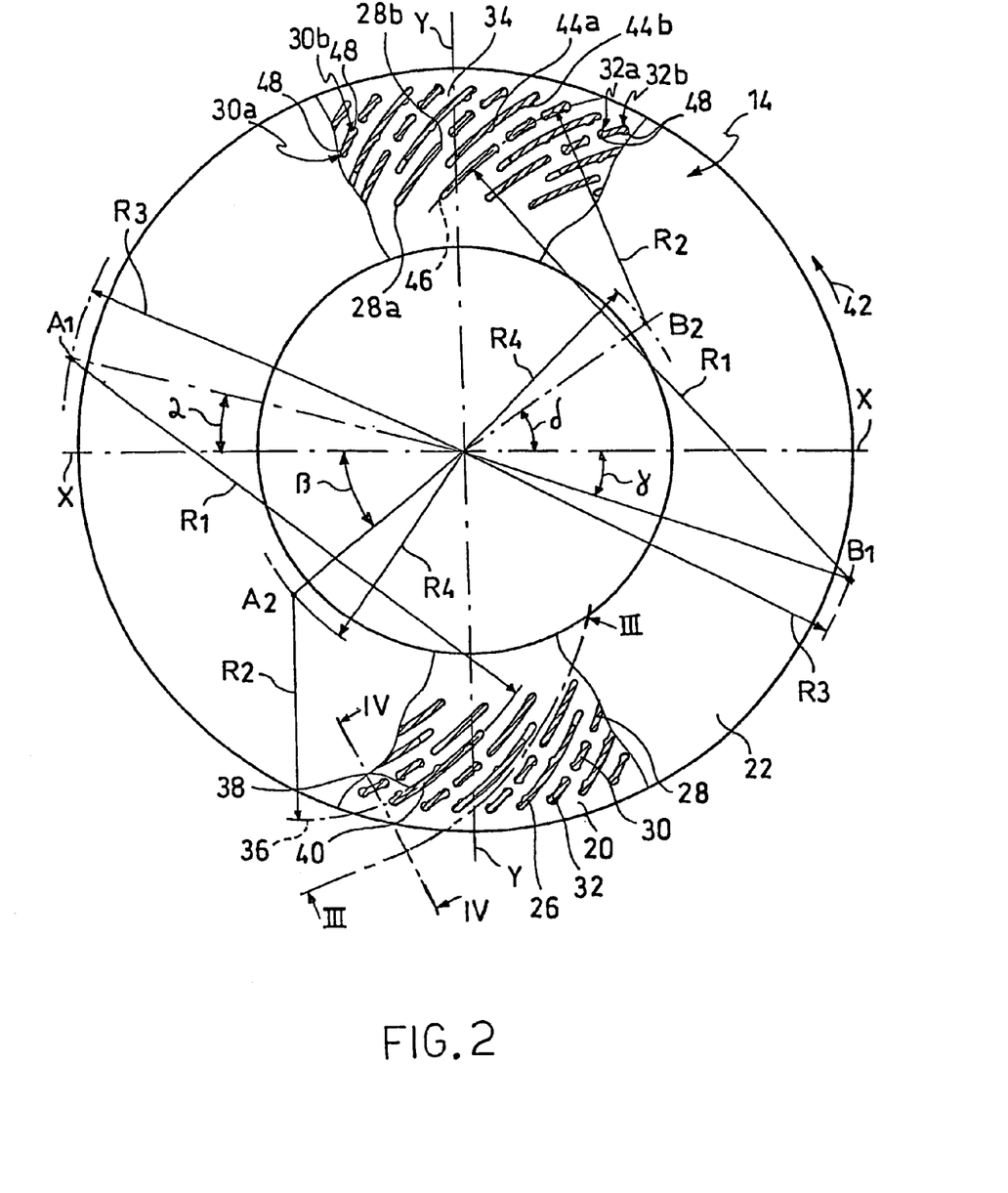
FIG. 2 is a partially-sectioned front view of a detail of FIG. 1 in the rough, unfinished state.
Figure 3:
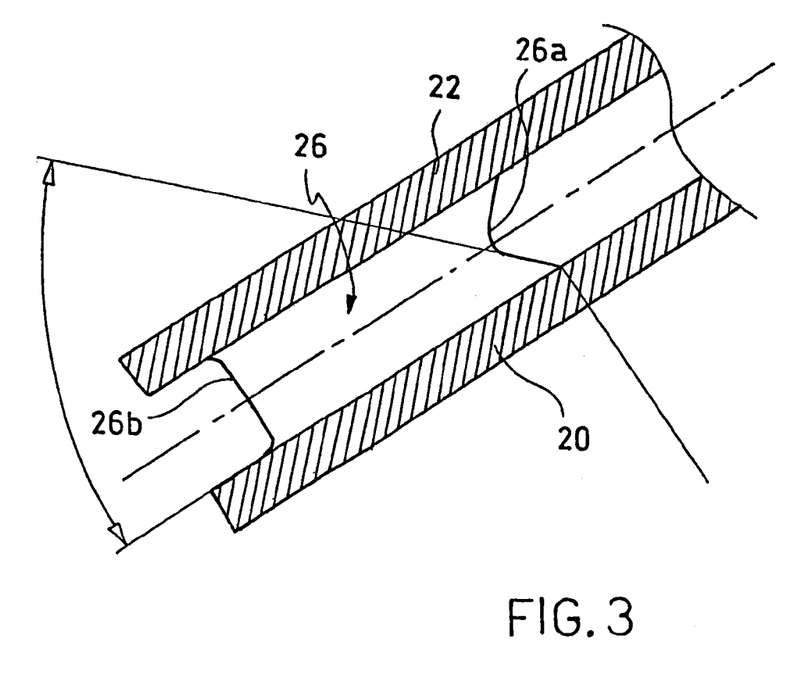
FIG. 3 is a section taken on the line III-III through the detail of FIG. 2.

The inner end 26a is positioned on a median circle, that is, a circle with a diameter corresponding to a middle value between the values of the inside diameter and of the outside diameter of the braking band 14, in the rough, unfinished state (FIG. 2). The outer end 26b is positioned in the vicinity of the outer circumference of the braking band 14.

As shown in FIG. 2, that is, in a plane parallel to the plates 20 and 22, the first fin 26 extends along an arcuate line, indicated 36, relative to which a concave surface 38 and a convex surface 40 of the first fin can be defined.

An arrow representing the principle direction of rotation of the disc 10, that is, the direction of rotation corresponding to the forward direction of movement of the vehicle, is indicated 42.

Relative to this direction of rotation, the first fin 26 is arranged substantially in a manner such that the concave surface 38 and the convex surface 40 are upstream and downstream of the arcuate line 36, respectively.

The arcuate line 36 extends continuously along two circles which are defined below with reference to the system of Cartesian axes X and Y shown in FIG. 2.

In fact, the inner portion of the first fin 26, that is the portion closest to the axis Z-Z, extends along a portion of a circle of radius $R_1$ and of centre $A_1$, whereas the outer portion of the first fin 26, that is the portion farthest from the axis Z-Z, extends along a portion of a circle of radius $R_2$ and of centre $A_2$.

The radius $R_1$ of the inner portion of the first fin 26 is greater than the radius $R_2$ of the outer portion of the first fin 26.

The positions of the above-mentioned two centres $A_1$ and $A_2$ are also indicated in FIG. 2. In particular, the centre $A_1$ is disposed on a circle of radius $R_3$, outside the braking band 14, whereas the centre $A_2$ is disposed on a circle of radius $R_4$ having a diameter between the inside diameter and the outside diameter of the rough, unfinished braking band 14.

The outer portion of the first fin 26 is thus more arcuate than its inner portion and the outer portion of the respective ventilation duct 34 consequently deviates further in the direction contrary to the direction of rotation of the disc 10.

In FIG. 2, at the dimensional control stage, the centre $A_1$ is given by the intersection of the circle of radius $R_3$ and a straight line extending through the centre of the system of axes X and Y and inclined at an angle α of about 14° to the axis X. Similarly, the centre $A_2$ is given by the intersection of the circle of radius $R_4$ and a straight line extending through the centre of the system of axes X and Y and inclined at an angle β of about 40° to the axis X.

The first fin 26 also comprises two projections 44a and 44b which project from the concave surface 38 towards the interior of the ventilation duct 34. The first projection 44a is positioned approximately centrally relative to the length of the first fin 26, whereas the second projection 44b is positioned in the vicinity of the outer end 26b.

The first fin 26 is repeated around the space 24 at predefined intervals which permit the production of a disc with about 20-50 first fins.

The further fins 28, 30 and 32 which, for simplicity of explanation, will be indicated as a second, a third, and a fourth fin, are positioned along further arcuate line, indicated 46.

This further arcuate line 46 is offset relative to the arcuate line 36 by a distance equal to half of the intervals at which the arcuate lines 36 are repeated. The alternating arrangement of the first fin 26 along the arcuate line 36 and of the other fins 28, 30 and 32 along the further arcuate line 46 permits the production of a disc with approximately 40-100 ventilation ducts 34.

The further arcuate line 46 also extends continuously along two circles which are defined below with reference to the system of Cartesian axes X and Y shown in FIG. 2.

In fact, the inner portion of the arcuate line 46, that is the portion closest to the axis Z-Z, extends along a portion of a circle of radius $R_1$ and of centre $B_1$, whereas the outer portion of the further arcuate line 46, that is the portion farthest from the axis Z-Z, extends along a portion of a circle of radius $R_2$ and of centre $B_2$.

The radius $R_1$ of the inner portion of the arcuate line 46 is greater than the radius $R_2$ of the outer portion of the arcuate line 46 and, in particular, these radii correspond to the respective radii defining the arcuate line 36 of the first fin 26.

The outer portion of the further arcuate line 46 is therefore more arcuate than its inner portion and the outer portion of the respective ventilation duct 34 consequently deviates further in the direction contrary to the direction of rotation of the disc 10. All of the ventilation ducts 34 therefore deviate in the same direction, contrary to the direction of rotation of the disc.

The positions of the two above-mentioned centres $B_1$ and $B_2$ are indicated in FIG. 2. According to the preferred embodiment shown in FIG. 2, the centre $B_1$ is disposed on a circle of radius $R_3$ outside the braking band 14, whereas the centre $B_2$ is disposed on a circle of radius $R_4$ having a diameter between the inside diameter and the outside diameter of the braking band 14. As can readily be inferred from the foregoing statements, the centre $A_1$ and the centre $B_1$ preferably lie on the same circle of radius $R_3$ and, similarly, the centre $A_2$ and the centre $B_2$ preferably lie on the same circle of radius $R_4$.

In FIG. 2, at the dimensional control stage, the centre $B_1$ is given by the intersection of the circle of radius $R_3$ with a straight line extending through the centre of the system of axes X and Y and inclined at an angle γ of about 19° to the axis X. Similarly, the centre $B_2$ is given by the intersection of the circle of radius $R_4$ with a straight line extending through the centre of the system of axes X and Y and inclined at an angle δ of about 34° to the axis X.

As mentioned above, the second fin 28, the third fin 30, and the fourth fin 32 are disposed along the further arcuate line 46.

The second fin 28 connects the first plate 20 and the second plate 22 continuously. Moreover, the second fin 28 has an inner end 28a disposed in the vicinity of the inner diameter of the braking band 14 in the rough, unfinished state and an outer end 28b corresponding to the output edge and disposed slightly beyond the above-mentioned median circle, that is, the circle of mean diameter between the inside and outside diameters of the braking band 14 in the rough, unfinished state.

Figure 5:
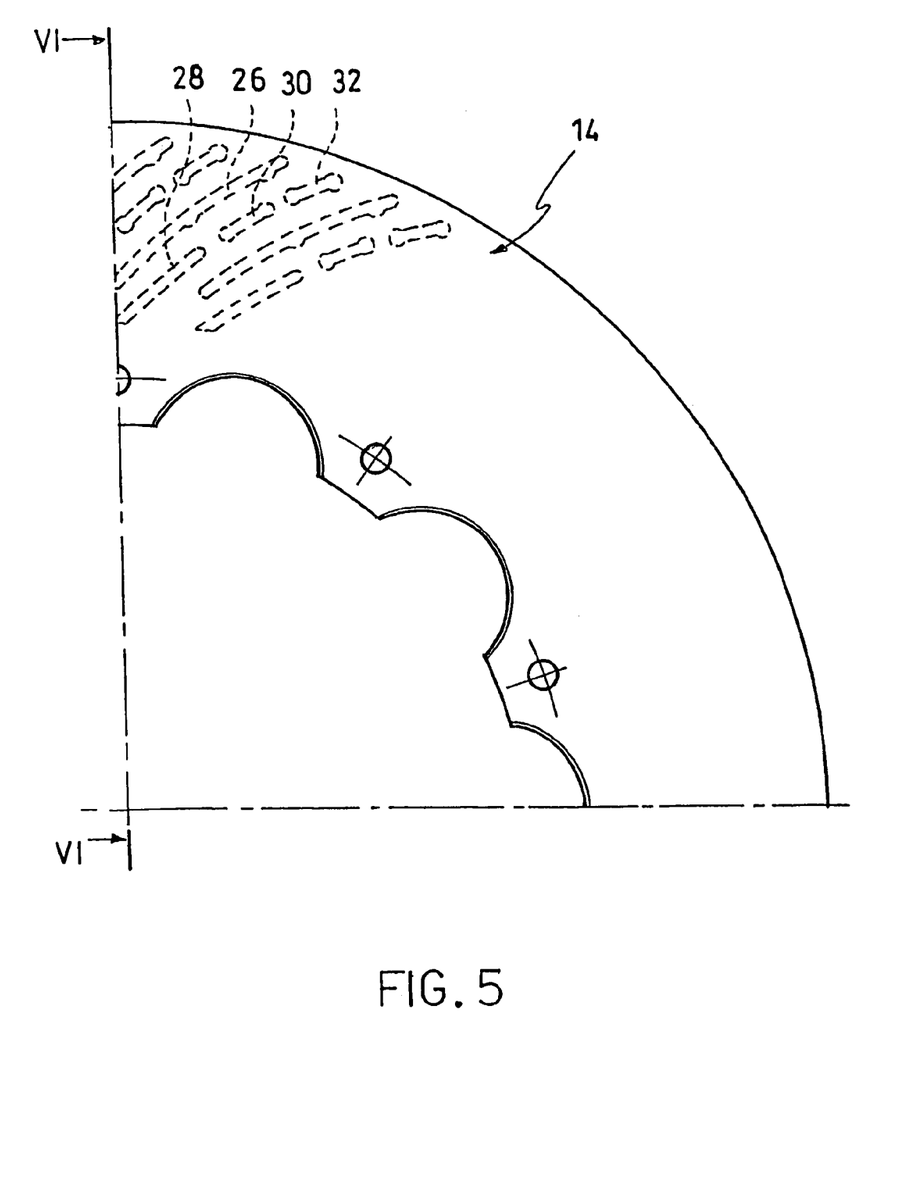
FIG. 5 is a front view of a finished detail of FIG. 1.
Figure 6:
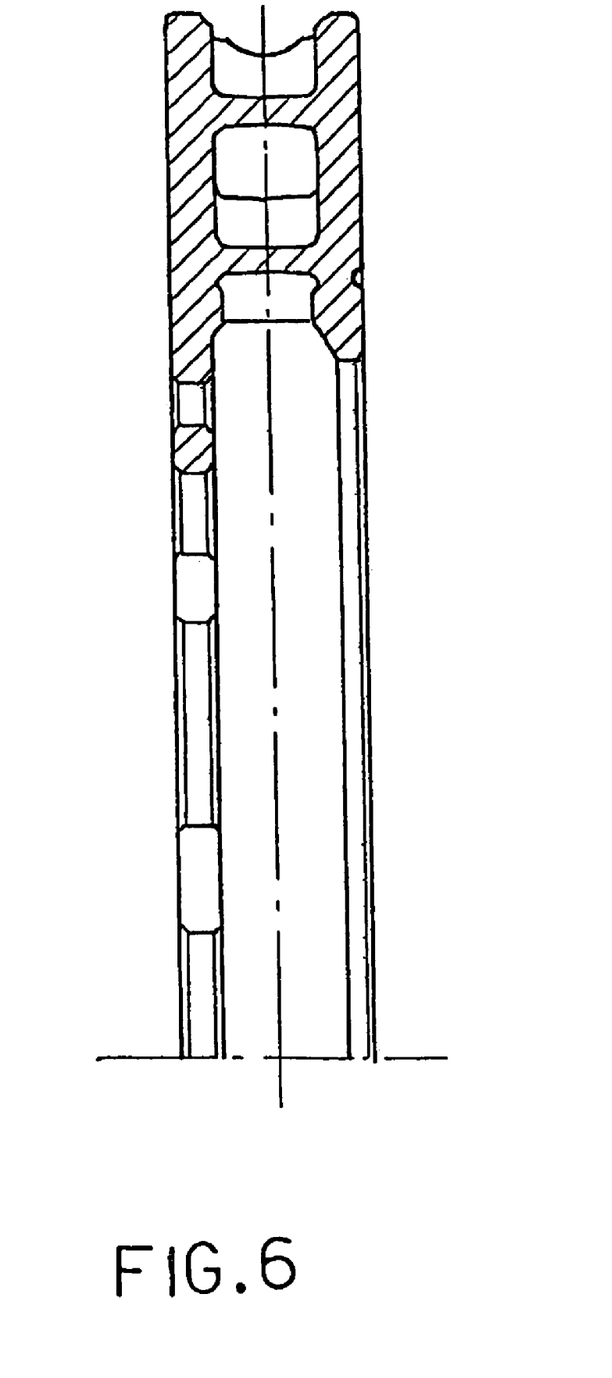
FIG. 6 is a section taken on the line VI-VI through the detail of FIG. 5.

In a substantially finished braking band 14, the second fin 28 adopts the configuration shown in FIG. 5, in which the machining undergone by the first end 28a is clear.

The third fin 30 is disposed along the same arcuate line 46 in a manner such that an inner end 30a thereof is disposed slightly beyond the above-mentioned median circle and an outer end 30b thereof is disposed in the vicinity of a circle of mean diameter between the diameters of the above-mentioned median circle and the outer circumference of the braking band 14.

Both the inner end 30a and the outer end 30b have portions 48 which are enlarged in comparison with the thickness of the fin itself.

As shown in FIG. 2, the third fin 30 is disposed substantially in an annular region between the two projections 44a and 44b of the first fin 26.

Finally, the fourth fin 32 is disposed along the further arcuate line 46. This last fin has an inner end 32a disposed on a circle substantially corresponding to the second projection 44*b* of the first fin 26 and an outer end 32*b* disposed in the vicinity of the outer circumference of the braking band 14.

The fourth fin 32 is structurally identical to the third fin 30, since both its inner end 32*a* and its outer end 32*b* have portions 48 which are enlarged in comparison with the thickness of the fin itself.

The disc-brake disc according to the invention satisfies the above-mentioned requirement and prevents the problems mentioned with reference to the prior art. In fact, as explained above, the structure of the disc according to the invention increases cooling efficiency, as is shown by the test results obtained and given in the following table, with a disc-brake disc produced in accordance with the teaching of U.S. Pat. No. 5,427,212 as a control:

|  | U.S. Pat. No. 5,427,212 | Present invention |
| --- | --- | --- |
| Weight (kg) | 5,900 | 5,780 |
| Disc temperature [° C.] | 490 | 470 |
| Pad temperature [° C.] | 480 | 450 |
| Caliper-fluid temperature [° C.] | 130 | 120 |
| Pad wear [mm] | 6.9 | 6.7 |
| "Disc stiffness" parameter | 5.4 | 5.3 |

The second column relates to a disc having the characteristics described in U.S. Pat. No. 5,427,212, that is, a ventilated disc forming part of the prior art and selected as a control. The third column, on the other hand, relates to a disc which has the above-described characteristics and hence to a disc according to the present invention.

The individual parameters taken into consideration have the following significance. In the first place, the term "weight" means the weight of the machined, finished braking band 14 (FIG. 5).

The disc temperature corresponds to the temperature of the surface of the braking band 14 measured at the start of one of the braking operations after the disc has been brought to steady-state conditions during the test cycle.

The pad temperature corresponds to the mean temperature of the pad measured at the same moment at which the disc temperature was measured.

The term "caliper-fluid temperature" means the maximum temperature of the brake fluid in the caliper, measured at the end of the test cycle.

The term "pad wear" indicates the mean wear of the pads upon completion of the test cycle.

Finally, the expression "disc stiffness" defines an index of the travel of the brake pedal, evaluated as the pressure which the pump manages to develop for each millimetre of travel of the caliper piston.

The results given above were obtained with a test cycle on a dynamometric bench, the test parameters being kept constant in both of the cases considered. In particular, the parameters which were kept constant were the energy dissipated upon each braking operation, the time between the start of one braking operation and the start of the next braking operation, the torque developed during each braking operation and the number of braking operations.

As can be appreciated from the foregoing description, it is clear that the novel configuration of the fins, and consequently of the ventilation ducts, enables greater cooling efficiency to be achieved.

A further advantage of the disc-brake disc according to the invention lies in the fact that it is structurally and functionally simple so that it is inexpensive to produce and ensures reliable operation over time.

Naturally, in order to satisfy contingent and specific requirements, a person skilled in the art may apply to the disc-brake disc according to the invention many modifications and variations all of which, however, are included within the scope of protection of the invention as defined by the appended claims.

For example, the projections or the enlarged portions may have shapes, sizes and positions other than those described and illustrated.

Moreover, the braking surfaces may equally well be smooth, perforated, or with either linear or arcuate grooves, or may be both perforated and grooved.

What is claimed is:

1. A braking band for a disc-brake disc, comprising:
a first plate and a second plate, said plates arranged face to face so as to form a space,
a plurality of spacer elements which connect the first plate and the second plate, the plurality of spacer elements being constituted by a module of spacer elements which is repeated at predetermined intervals around a circle coaxial with the braking band so as to form a plurality of repeated modules and a plurality of ventilation ducts distributed uniformly around the space between the two plates,
each module of spacer elements comprising a first fin, the first fin connecting the first plate to the second plate and having an elongated shape that defines a first internal line, said internal line of each said first fin extending along a particular one of a plurality of first arcuate lines which are not tangent to the braking band, and
said each module of spacer elements further comprising a second fin, a third fin, and a fourth fin, the second, third and fourth fins connecting the first plate to the second plate and each having an elongated shape that defines a second, third, and fourth internal line respectively, said second internal line of each said second fin extending along a particular one of a plurality of second arcuate lines which are not tangent to the braking band, said second arcuate line also extending along the third internal line for said third fin and along the fourth internal line for said fourth fin,
wherein said each module of spacer elements are repeated at said predetermined intervals around a circle coaxial with the braking band so as to form said plurality of modules thereby providing said band with a plurality of said first fins, said second fins, said third fins and said fourth fins, in which each said first, each said second, each said third and each said fourth fins belongs to a particular module of said plurality of modules,
wherein each first fin of said plurality of first fins defines said first internal line extending along a particular one of said plurality of first arcuate lines, each first arcuate line being repeated at said predetermined intervals so as to form said plurality of first arcuate lines,
wherein each second, third and fourth fin of said plurality of second, third and fourth fins defines respectively said second, third and fourth internal line, said second internal line of each second fin extending along a particular one of said plurality of second arcuate lines, said second arcuate line also extending along the third internal line for a third fin belonging to the same module and along the fourth internal line for a fourth fin belonging to the same module, wherein each second arcuate line is repeated at said predetermined intervals so as to form said plurality of second arcuate lines, each second arcuate line being alternated to a first arcuate line around a circle coaxial with the braking band and offset relative to the adjacent first arcuate line by a distance equal to half of the predetermined intervals at which the first arcuate lines are repeated, and wherein said plurality of spacer elements consists of said first fins, second fins, third fins and fourth fins whereby each spacer element of said plurality of spacer elements belongs to one particular module of said plurality of modules.

2. A braking band according to claim 1 in which each of said plurality of first arcuate lines extends along portions of two circles.

3. A braking band according to claim 2, in which an inner portion of each said first arcuate line extends along a portion of a circle having a radius $R_1$ and a centre $A_1$, and an outer portion of the arcuate line extends along a portion of a circle having a radius $R_2$ and a centre $A_2$, and wherein $R_1$ is greater than $R_2$.

4. A braking band according to claim 3 in which $A_1$ is further from the centre of the braking band than $A_2$.

5. A braking band according to claim 4 in which $A_1$ lies on a circle of radius $R_3$ outside the outer circumference of the braking band and $A_2$ lies on a circle of radius $R_4$ disposed between the outer circumference and the inner circumference of the braking band.

6. A braking band according to claim 3, in which each said second arcuate line extends along portions of two circles.

7. A braking band according to claim 6 in which an inner portion of each said second arcuate line extends along a portion of a circle of radius $R_1$ and centre $B_1$, an outer portion of said second arcuate line extends along a portion of a circle of radius $R_2$ and centre $B_2$, and wherein $R_1$ is greater than $R_2$.

8. A braking band according to claim 7 in which $B_1$ is further from the centre of the braking band than $B_2$.

9. A braking band according to claim 8 in which $B_1$ lies on a circle of radius $R_3$ outside the outer circumference of the braking band and $B_2$ lies on a circle of radius $R_4$ disposed between the outer circumference and the inner circumference of the finished braking band.

10. A braking band according to claim 3 in which the radii of the circles along which the inner portions of the first arcuate lines and of the second arcuate lines extend are identical.

11. A braking band according to claim 3 in which the radii of the circles along which the outer portions of the first arcuate lines and of the second arcuate lines extend are identical.

12. A braking band according to claim 7 in which $B_1$ lies on a same circle of radius $R_3$ on which the centre $A_1$ lies.

13. A braking band according to claim 7 in which $B_2$ lies on a same circle of radius $R_4$ on which the centre $A_2$ lies.

14. A braking band according to claim 1 in which at least one of the first fins comprises at least one projection.

15. A braking band according to claim 14 in which the at least one projection is disposed on a concave surface of the first fin.

16. A braking band according to claim 15 in which the concave surface comprises a first projection positioned approximately centrally relative to the length of the first fin and a second projection positioned in the vicinity of an outer end of the first fin.

17. A braking band according to claim 1 in which each first fin comprises an inner end positioned on a circle of substantially mean diameter between the inside and outside diameters of the braking band.

18. A braking band according to claim 1 in which the first fin comprises a "V"-shaped inner end.

19. A braking band according to claim 18 in which the "V"-shaped inner end has its concavity facing towards the centre of the braking band.

20. A braking band according to claim 1 in which each second fin comprises an inner end disposed in the vicinity of the inner circumference of the braking band and an outer end disposed in the vicinity of a circle of substantially mean diameter between the inside and outside diameters of the braking band.

21. A braking band according to claim 1 in which each third fin comprises an inner end disposed in the vicinity of a median circle of substantially mean diameter between the inside and outside diameters of the braking band, and an outer end disposed in the vicinity of a circle of mean diameter between that of the median circle and the outer circumference of the braking band.

22. A braking band according to claim 1 in which each third fin comprises an inner end and an outer end having portions which are enlarged in comparison with the thickness of the third fin.

23. A braking band according to claim 1 in which each fourth fin comprises an inner end and an outer end having portions which are enlarged in comparison with the thickness of the fourth fin.

24. A braking band according to claim 16 in which the fourth fin has an inner end disposed on a circle substantially defined by the second projections of the first fin and an outer end disposed near the outer circumference of the braking band.

25. A disc-brake disc comprising a braking band and said braking band comprising:
a first plate and a second plate, said plates arranged face to face so as to form a space,
a plurality of spacer elements which connect the first plate and the second plate, the plurality of spacer elements being constituted by a module of spacer elements which is repeated at predetermined intervals around a circle coaxial with the braking band so as to form a plurality of repeated modules and a plurality of ventilation ducts distributed uniformly around the space between the two plates,
each module of spacer elements comprising a first fin, the first fin connecting the first plate to the second plate and having an elongated shape that defines a first internal line, said internal line of each said first fin extending along a particular one of a plurality of first arcuate lines which are not tangent to the braking band, and
each said module of spacer elements further comprising a second fin, a third fin, and a fourth fin, the second, third and fourth fins connecting the first plate to the second plate and each having an elongated shape that defines a second, third, and fourth internal line respectively, said second internal line of each said second fin extending along a particular one of a plurality of second arcuate lines which are not tangent to the braking band, said second arcuate line also extending along the third internal line for said third fin and along the fourth internal line for said fourth fin,
wherein said each module of spacer elements are repeated at said predetermined intervals around a circle coaxial with the braking band so as to form said plurality of modules thereby providing said band with a plurality of said first fins, said second fins, said third fins and said fourth fins, in which each said first, each said second, each said third and each said fourth fins belongs to a particular module of said plurality of modules, wherein each first fin of said plurality of first fins defines said first internal line extending along a particular one of said plurality of first arcuate lines, each first arcuate line being repeated at said predetermined intervals so as to form said plurality of first arcuate lines, wherein each second, third and fourth fin of said plurality of second, third and fourth fins defines respectively said second, third and fourth internal line, said second internal line of each second fin extending along a particular one of said plurality of second arcuate lines, said second arcuate line also extending along the third internal line for a third fin belonging to the same module and along the fourth internal line for a fourth fin belonging to the same module, wherein each second arcuate line is repeated at said predetermined intervals so as to form said plurality of second arcuate lines, each second arcuate line being alternated to a first arcuate line around a circle coaxial with the braking band and offset relative to the adjacent first arcuate line by a distance equal to half of the predetermined intervals at which the first arcuate lines are repeated, and wherein said plurality of spacer elements consists of said first fins, second fins, third fins and fourth fins whereby each spacer element of said plurality of spacer elements belongs to one particular module of said plurality of modules.

26. A disc-brake disc according to claim 25 in which each of said plurality of first arcuate lines extends along portions of two circles.

27. A disc-brake disc according to claim 26, in which an inner portion of each said first arcuate line extends along a portion of a circle having a radius $R_1$ and a centre $A_1$, and an outer portion of the arcuate line extends along a portion of a circle having a radius $R_2$ and a centre $A_2$, and wherein $R_1$ is greater than $R_2$.

28. A disc-brake disc according to claim 27 in which $A_1$ is further from the centre of the braking band than $A_2$.

29. A disc-brake disc according to claim 28 in which $A_1$ lies on a circle of radius $R_3$ outside the outer circumference of the braking band and $A_2$ lies on a circle of radius $R_4$ disposed between the outer circumference and the inner circumference of the braking band.

30. A disc-brake disc according to claim 27, in which each said second arcuate line extends along portions of two circles.

31. A disc-brake disc according to claim 30 in which an inner portion of each said second arcuate line extends along a portion of a circle of radius $R_1$ and centre $B_1$, an outer portion of said second arcuate line extends along a portion of a circle of radius $R_2$ and centre $B_2$, and wherein $R_1$ is greater than $R_2$.

32. A disc-brake disc according to claim 30 in which $B_1$ is further from the centre of the braking band than $B_2$.

33. A disc-brake disc according to claim 32 in which $B_1$ lies on a circle of radius $R_3$ outside the outer circumference of the braking band and $B_2$ lies on a circle of radius $R_4$ disposed between the outer circumference and the inner circumference of the braking band.

34. A disc-brake disc according to claims 27 in which the radii of the circles along which the inner portions of the first arcuate lines and of the second arcuate lines extend are identical.

35. A disc-brake disc according to claims 27 in which the radii of the circles along which the outer portions of the first arcuate lines and of the second arcuate lines extend are identical.

36. A disc-brake disc according to claim 31 in which $B_1$ lies on a same circle of radius $R_3$ on which the centre $A_1$ lies.

37. A disc-brake disc according to claim 31 in which $B_2$ lies on a same circle of radius $R_4$ on which the centre $A_2$ lies.

38. A disc-brake disc according to claim 25 in which at least one of the first fins comprises at least one projection.

39. A disc-brake disc according to claim 38 in which the at least one projection is disposed on a concave surface of the first fin.

40. A disc-brake disc according to claim 39 in which the concave surface comprises a first projection positioned approximately centrally relative to the length of the first fin and a second projection positioned in the vicinity of an outer end of the first fin.

41. A disc-brake disc according to claim 25 in which each first fin comprises an inner end positioned on a circle of substantially mean diameter between the inside and outside diameters of the braking band.

42. A disc-brake disc according to claim 25 in which the first fin comprises a "V"-shaped inner end.

43. A disc-brake disc according to claim 42 in which the "V"-shaped inner end has its concavity facing towards the centre of the braking band.

44. A disc-brake disc according to claim 25 in which each second fin comprises an inner end disposed in the vicinity of the inner circumference of the braking band and an outer end disposed in the vicinity of a circle of substantially mean diameter between the inside and outside diameters of the braking band.

45. A disc-brake disc according to claim 25 in which each third fin comprises an inner end disposed in the vicinity of a median circle of substantially mean diameter between the inside and outside diameters of the braking band, and an outer end disposed in the vicinity of a circle of mean diameter between that of the median circle and the outer circumference of the braking band.

46. A disc-brake disc according to claim 25 in which each third fin comprises an inner end and an outer end having portions which are enlarged in comparison with the thickness of the third fin.

47. A disc-brake disc according to claim 25 in which each fourth fin comprises an inner end and an outer end having portions which are enlarged in comparison with the thickness of the fourth fin.

48. A disc-brake disc according to claim 40 in which the fourth fin has an inner end disposed on a circle substantially defined by the second projections of the first fins and an outer end disposed near the outer circumference of the braking band.

* * * * *